(12) United States Patent
Hsu

(10) Patent No.: US 7,388,484 B2
(45) Date of Patent: Jun. 17, 2008

(54) CONDUCTIVE TAMPER SWITCH FOR SECURITY DEVICES

(75) Inventor: Wen-Hua Hsu, Forest Hills, NY (US)

(73) Assignee: Honeywell International Inc., Morristown, NJ (US)

(*) Notice: Subject to any disclaimer, the term of this patent is extended or adjusted under 35 U.S.C. 154(b) by 271 days.

(21) Appl. No.: 11/204,781

(22) Filed: Aug. 16, 2005

(65) Prior Publication Data

US 2007/0040674 A1    Feb. 22, 2007

(51) Int. Cl.
G08B 1/08     (2006.01)
H04Q 7/00     (2006.01)

(52) U.S. Cl. .............. 340/539.31; 340/506; 340/568.1; 340/568.2

(58) Field of Classification Search ........... 340/539.31, 340/506, 545.6, 568.1, 568.2, 572.8, 693.5, 340/693.9, 693.12; 361/616, 672, 600, 627, 361/644
See application file for complete search history.

(56) References Cited

U.S. PATENT DOCUMENTS

| | | | | |
|---|---|---|---|---|
| 2,224,551 A | | 12/1940 | Roeder | |
| 3,247,502 A | * | 4/1966 | Eberts | 340/539.31 |
| 4,041,265 A | * | 8/1977 | Brave et al. | 340/506 |
| 4,150,371 A | * | 4/1979 | Scaglione | 340/545.6 |
| 4,167,733 A | * | 9/1979 | Krause et al. | 340/539.31 |
| 4,599,498 A | | 7/1986 | Shimoya et al. | |
| 5,612,675 A | * | 3/1997 | Jennings et al. | 340/539.31 |
| 5,748,083 A | | 5/1998 | Rietkerk | |
| 5,764,729 A | * | 6/1998 | Black et al. | 340/566 |
| 6,016,677 A | | 1/2000 | Clark | |
| 6,288,353 B1 | | 9/2001 | Chiang | |
| 6,297,745 B1 | | 10/2001 | Meier | |
| 6,677,742 B1 | * | 1/2004 | Voisine et al. | 324/110 |
| 7,049,970 B2 | * | 5/2006 | Allen et al. | 340/568.2 |
| 7,167,092 B2 | * | 1/2007 | Higashiyama et al. | 340/568.1 |
| 7,170,403 B2 | * | 1/2007 | Noguchi | 340/539.31 |
| 2003/0227766 A1 | | 12/2003 | Hom et al. | |
| 2005/0140496 A1 | | 6/2005 | Magner et al. | |

* cited by examiner

Primary Examiner—John Tweel, Jr.
(74) Attorney, Agent, or Firm—Scully, Scott, Murphy & Presser, P.C.

(57) ABSTRACT

A tamper switch mechanism utilized in security interface devices such as keypad installations to render them tamper-resistant, wherein the devices are generally connected to burglar alarm and fire alarm systems. More particularly, provided is a conductive tamper switch which is installed in a security interface device, such as a keypad, which upon an unauthorized attempt to dislodge the device or keypad from a wall or surface on which it is mounted, will trigger an alarm or generate a warning signal at a monitoring site indicative that an effort at tampering with the device has been effected. Also disclosed is a method of providing the tamper switch mechanism in a security interface device, such as a keypad installation.

32 Claims, 4 Drawing Sheets

CONDUCTIVE TAMPER SWITCH FOR SECURITY DEVICES

BACKGROUND OF THE INVENTION

1. Field of the Invention

The present invention relates to a switch mechanism utilized in security interface devices such as keypad installations to render them tamper-resistant, wherein the devices are generally connected to burglar alarm and fire alarm systems.

More particularly, the present invention pertains to the provision of a conductive tamper switch which is installed in a security interface device, such as a keypad, which upon an unauthorized attempt to dislodge the device or keypad from a wall or surface on which it is mounted, will trigger an alarm or generate a warning signal at a monitoring site indicative that an effort at tampering with the device has been effected.

Currently, security interface devices, such as those which consist of keypad units, are normally mounted on the walls or other upright surfaces of the most diverse locations, such as in homes, apartments, offices and manufacturing sites and plants. The security interface devices are frequently equipped with tamper-indicating structures. For instance, such structures may comprises tamper switches installed in the keypads, and among other locales, which may contact electronic operative components contained in the keypad housings, such as printed circuit boards (PCBs). However, presently employed tamper-indicating structures may be sensitive to noises such as mounting surface conditions, the skill of an installer, the proper assembly of a tamper switch and keypad enclosure, and may even be unduly sensitive to external environmental and weather conditions. For example, upon the installation of a security interface device, such as a keypad, on a wall surface which is subject to uneven surface mounting properties, it is possible that a tamper post contained in the housing, wherein the tamper post is intended to be in contact with electronic circuitry on a printed circuit board located in the keypad housing may be offset and misaligned from a tamper switch on the printed circuit board subsequent to the installation of the keypad, thereby leading to potential tamper detecting malfunctions. Consequently, the personnel or installers which are engaged in mounting the security interface devices must be capable of properly implementing any necessary adjustments to either the security interface device or to the surface of the wall in order to be able to ensure the reliable functioning thereof in connection with the tamper-detecting mechanism subsequent to installation of the device.

Such tamper-detecting devices have heretofore been comprised of plastic or rubber posts or metallic spring members, which are mounted interiorly of the keypad housing and extend from the back housing portion forwardly into contact with a tamper switch or contact located on a printed circuit board contained within the keypad housing, whereby any attempt to pull the keypad device from the wall in an unauthorized manner will cause a disengagement between contacts formed by the tamper post or spring and a tamper switch mounted on the printed circuit board or to rupture a segment of the back housing mounting the tamper post, so as to produce a short circuit in the electronic system of the printed circuit board and to consequently trigger a signal raising an audible alarm and/or notifying a remote location which monitors the function of the keyboard or the security device, such as at an alarm company or law protective agency.

Moreover, this type of prior art structure, upon the unauthorized pulling off the front cover portion of the keypad housing, will trigger an alarm signifying that tampering has occurred, but is not adapted to provide a disconnection between the printed circuit board and the tamper post or spring which activates the tamper switch when the keypad housing is pulled away from the wall in its entirety, rather than merely the front housing part, unless the frangible segment of the back casing of the housing is ruptured, which segment is fastened to the wall, whereby the tamper post which is mounted on that segment and normally contacts the tamper switch on the printed circuit board, is concurrently pulled away from the printed circuit board so as to break contact therewith. This, of course, in due course requires replacement of the damaged rear portion of the keypad housing for reuse thereof. Thus, a good installation, which incorporates a tamper switch or mechanism utilized in the security interface device, such as a wall or surface mounted keypad, not only requires an assured reliability in reporting any tampering, but in addition to such functional requirements should also be cost effective in the manufacture, installation and utilization thereof in service over a lengthy service life.

2. Discussion of the Prior Art

Clark, U.S. Pat. No. 6,016,677 discloses a keypad for a door lock including a tamper detection and response feature whereby the unauthorized removal of a part or a front portion of the keypad, which forms a component of a deadbolt lock will activate a sensor switch utilized on a push/pull lock arrangement. This provides that the lock is automatically relocked when the mechanism is in a secured position, and in which whereby the system of the keypad provides for a remote enable and disable unit, directs a detection and a response unit, a low battery sensing arrangement, includes a bolt extension indicating feature and adjustable bolt throw feature. This is a relatively complex configuration, which does not readily lend itself to a simple tamper indicating switch mechanism which is incorporated in a wall or surface mounted keypad security device.

Magner, et al., U.S. Patent Publication No. 2005/0140496 A1 discloses a keypad and method providing for electronic access security and keyless entry of a vehicle. In that instance, there is disclosed a keypad for the keyless entry of the vehicle, including a coded arrangement. However, this particular structure does not incorporate a tamper-indicating feature analogous to that contemplated for by the present invention.

With regard to Hom, et al., U.S. Patent Publication No. 2003/0227766 A1, there is disclosed a keypad system including an illumination arrangement and light from LEDs which signify activation thereof. Again, there is no tamper indicating switch structure contacting a printed circuit board analogous to that employed in the present invention.

SUMMARY OF THE INVENTION

Accordingly, an advantage in the formation of a tamper switch installation in a wall or surface mounted keypad, which is highly efficient and reliable in operation while also concurrently being cost effective mounted, resides in the provision therein of a resilient rubber tamper switch, which possesses an electrically conductive end surface contacting a printed circuit board forming part of the operative system located within the keypad housing. The rubber tamper switch is normally in a compressed state upon the installation and mounting of the keypad on a surface or wall, in that in various embodiments of the invention, the tamper switch includes a rearwardly protruding portion, which is depressed upon the keypad being mounted on the wall or surface causing a constant contacting pressure to be exerted between the circuitry of the printed circuit board, which is fastened to the front cover of the keypad, and an electrically conductive end portion of the tamper switch during normal installation and operation of the keypad. Upon a tampering with the keypad by an unauthorized person, whereby the latter attempts to pull the front or cover portion of the keypad housing away from the back housing portion which is fastened to the wall or surface, this will cause the printed circuit board to be pulled forwardly, thereby enabling the compressed tamper switch, which is mounted to the interior of the housing back panel, to expand but lose contact of the conductive end thereof with the printed circuit board. The resultant short circuit or electrical malfunction will cause a signal to be generated and/or trigger an alarm at a remote monitoring installation or law enforcement agency, such as the police, indicative that a tampering action has been imparted to the keypad, and thereby alerting the appropriate authorities of that fact and to take protective steps.

Pursuant to another aspect of the present invention, upon the entire keypad housing being pulled from the wall as a integral unit, rather than merely the front or cover portion of the keypad housing being pulled away from the housing back panel, this will cause the tamper switch to also extend rearwardly and expand from its compressed state so as to cause the electrically conductive front end of the switch to lose contact with the printed circuit board, thereby also in this instance, resulting in the triggering of a signal or alarm indicative that tampering has taken place.

In accordance with a modified embodiment of the invention, wherein the keypad housing is mounted over an opening in the wall or surface, such as over a junction or switch box, or some other recess, there is provided a modified tamper switch configuration whereby the disengagement between the front and back panels of the keypad housing, such as a pulling away of the front or cover portion, will cause the compressed tamper switch to expand only forwardly from its mounted position in the rear panel, but to lose contact between the electrically conductive leading end thereof and the printed circuit board contained in the keypad housing, resulting in a short or malfunction and thereby again triggering a signal and/or raising an alarm at a monitoring location indicative that tampering with the keypad has taken place.

In order to achieve the maximum displacement for the tamper switch mechanism, the latter of which is constituted of a resilient material, such as rubber, and preferably of silicon rubber, which is highly resistant to deleterious and corrosive conditions while maintaining its elasticity and formative integrity, and wherein the tamper switch mechanism includes a leading end forming an electrically conductive surface for contacting a printed circuit board in the keyboard, such as being of a conductive metal, for instance, such as a gold plated copper or the like, or a conductive rubber or plastic composition, while imparting a high degree of flexibility and compressibility to the tamper switch mechanism. This preferred silicon rubber material also provides a high degree of flexibility when mounting the keypad possessing a rearwardly protruding tamper mechanism on an uneven surface or wall, thereby avoiding tamper switch offsets and misalignments with the PCB during installation of the keypad. Furthermore, utilizing silicon rubber for the tamper switch exhibits excellent resistance to compression set at room temperature, high and low temperature stability and resistance to deleterious chemical and weather conditions. Through the invention, there is an important cost savings involved when replacing presently employed tamper switches and eliminating a mounting screw which is employed in the connection of the frangible segment portion of the back housing panel in order to enable the segment to be broken away when pulling the keypad from a surface on which it is mounted, by the action of an unauthorized person. Pursuant to the invention, the mounting screw and the frangible segment portion are eliminated by employment of the novel rubber tamper switch design, thereby saving time for installers by an error proof alignment of the keypad components.

In essence, upon the installer completing the necessary wiring of the printed circuit board for activating an operation of the keypad, as is well known in the security device technology, by enclosing the front housing panel or cover and attaching it to the back panel of the keypad housing, the printed circuit board, the latter of which is located and mounted within the front cover portion of the keypad housing, makes contact with a conductive leading end pad which is mounted or molded on the compressible rubber switch and compresses the rubber shaft of the latter. The printed circuit board circuitry contact is now shorted with the conductive pad of the switch, and the compressed switch shaft applies contact pressure between the printed circuit board and the switch conductive pad during the entire period of time while the keypad is in its proper installed and operative state.

Upon an intruder unauthorizedly opening the front cover portion of the keypad housing which mounts the printed circuit board therein, while the security device is in activated service, the printed circuit board contact is separated from the electrically shorting conductive pad which is mounted at the end of the shaft of the rubber tamper switch and resultingly causes the security interface device to send out a signal indicative of a tampering attempt having taken place. Furthermore, in a tampering attempt, when the intruder rather than removing the front cover portion of the keypad housing, removes or pulls the entire device while intact from the surface on which it is mounted, the rubber switch also returns to the normal extended condition thereof, and causes the conductive pad on the shaft of the switch to be separated from the printed circuit board contact, thereby again causing the security interface device to transmit a signal indicative of a tampering having taken place.

Accordingly, it is an object of the present invention to provide a novel tamper switch mechanism for utilization in a security interface device, such as in a keypad.

Another object of the present invention is to provide a resilient or compressible tamper switch, which is mounted in a keypad housing and is in normal electrical contact with a printed circuit board and operative mechanism in the keypad housing in a compressed state and which will expand upon the unauthorized removal of the keypad housing from its mounting or the unauthorized removal of the front cover portion of the keypad housing, thereby breaking contact with the printed circuit board and emitting a tamper indicating signal.

BRIEF DESCRIPTION OF THE DRAWINGS

Reference may now be made to the following detailed description of preferred embodiments of the invention, taken in conjunction with the accompanying drawings; in which.

DETAILED DESCRIPTION OF THE INVENTION

Figure 1:
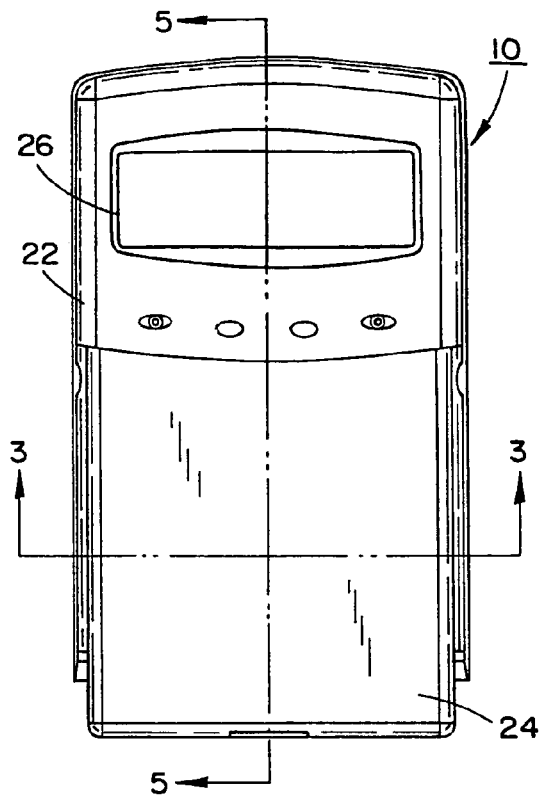
FIG. 1 illustrates a front view of a security interface device in the form of a keypad.
Figure 2:
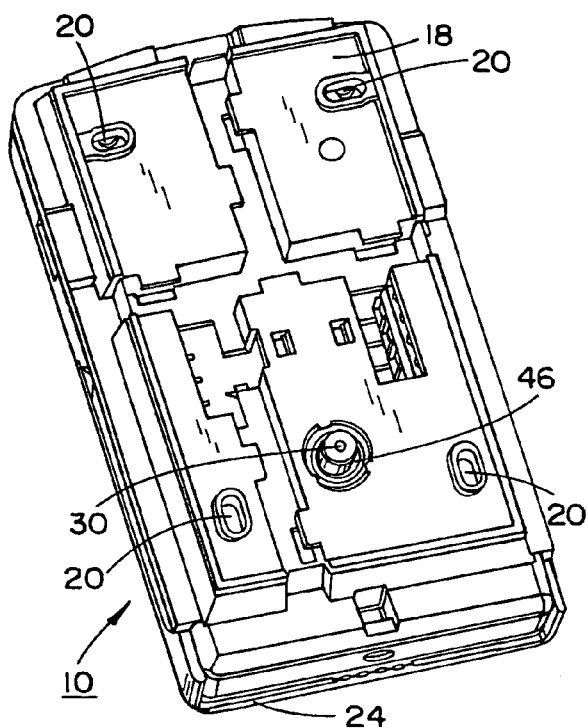
FIG. 2 illustrates a perspective rear view of the device of FIG. 1.
Figure 5:
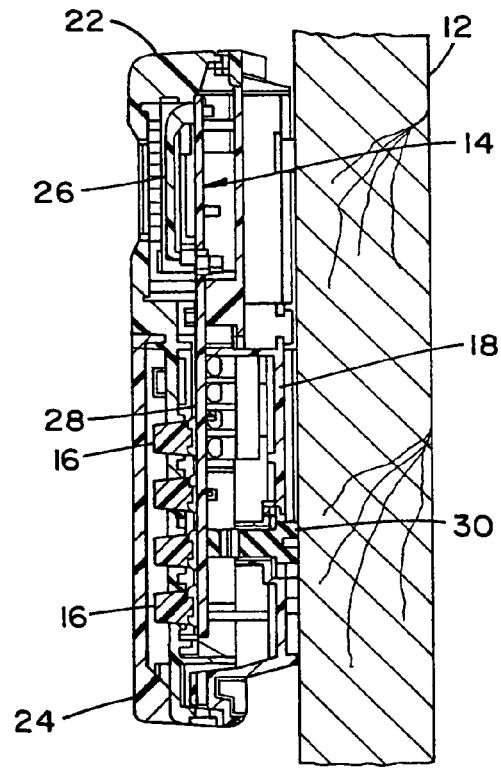
FIG. 5 illustrates a sectional view taken along line 5-5 in FIG. 1.

Referring now in specific detail to FIGS. 1 to 5 of the drawings, FIG. 1 illustrates a front view of a security interface device in the form of a keypad 10, which is adapted to be normally mounted on a vertical surface or wall 12, for example, as shown in FIG. 5 of the drawings. As illustrated, the keypad 10 contains the usual operating components including electronics and a printed circuit board 14 mounted therein. An array of touch keys 16 for imparting an operational activity code conjunction with a monitoring system (at a remote location), such as may be located at a burglar and fire alarm company or a law enforcement agency, for example, a local police station or precinct. The keys 16 may be activated by means of a touch control, or by means of a heat sensitive screen or panel, as is well known in the technology. The electronics and operating components housed within an essentially rectangular keypad housing, although other shapes are contemplateable, the latter of which may be comprised of or molded from a rigid plastic material, and which includes a rear closure casing or panel structure 18, as shown in FIG. 2 of the drawings, including screw-receiving apertures 20 for mounting the panel or the rear closure structure 18 to the upright wall or surface 12. Attachable to the rear casing structure 18 is a front housing cover member 22, which may include a bottom-hinged cover portion 24, adapted to be temporarily opened to enable access to the touch keys 16 for the inputting of coding information in order to either activate or deactivate the keypad and the alarm system, and closed at other times. The front cover or casing member 22 of the housing may also include a window opening 26 to enable a display of information as to whether the keypad system is activated or deactivated, and as to which particular locations on the premises are in a secured condition.

In essence, the keypad structure 10, as described herein to this point is well known in the technology, and such keypads, which are configured in essentially rectangular casings of varied sizes and colorations, although other shapes, such as round, can also be considered, and molded from plastic materials or metals are widely employed and installed in homes, apartments, offices, manufacturing facilities, and in the most diverse locations where it is desired to provide for a degree of security against break-ins, tampering or unauthorized entry, while concurrently affording operative communication with a monitoring system for fire and smoke detection, in addition to a burglar alarm, as may be desired by a particular user of the keypad. Generally, the interior operative structure, including the printed circuit board 14, which mounts or includes electronic circuitry for activating or deactivating the keypad functions is fastened to the interior 28 of the front cover member or casing 22 of the keypad housing, and is adapted to be detachably fastened to the rear closure panel or closure casing 18, which mounts the entire keypad housing containing the keypad operating arrangements to the wall or surface structure 12, as shown in FIG. 5 of the drawings.

In order to provide a clear indication and information as to unlawful tampering or attempt of tampering having taken place with the keypad 10, while the latter is mounted on the wall 12 and in an operative or so-called "armed" condition, and to possibly trigger an audible alarm at the site of the keypad installation and/or a signal at a remotely located monitoring installation, such as an alarm company or law enforcement authorities, pursuant to the invention there is provided a tamper switch mechanism in the keypad. This mechanism, in one embodiment of the invention, will provide a clear indication as to an occurrence of tampering upon either the unauthorized pulling away or removal of the front housing cover and casing member 22 of the keypad 10 from the wall-mounted rear or back housing casing 18, which is attached to the wall, or, alternatively, the indication of an attempt to pull the intact entire keypad arrangement 10 from the mounting thereof on the wall 12.

Figure 9:
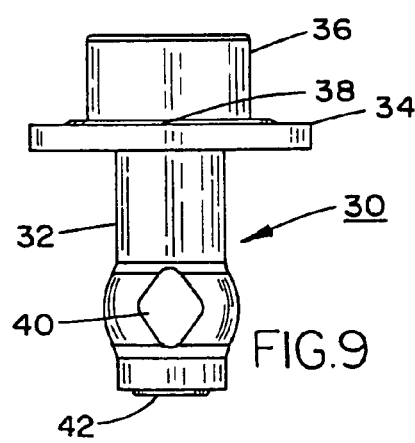
FIG. 9 illustrates a front view of the tamper switch showing in a compressed condition similar to that of FIG. 6.

In order to impart this particular function, as shown in FIGS. 3 through 10 of the drawings, there is provided a generally elastic or resiliently compressible tamper switch 30, which, as detailed in FIGS. 7 to 10, includes an elongated preferably cylindrical shaft or post 32 having an annular flange 34 at proximate one end and a preferably cylindrical projection 36 projecting beyond the flange. The flange 34 is connected to the projection 36 by means of a thin frusto-conical web structure 38 surrounding the former and located intermediate the switch ends. This enables the tamper switch 30 to be resiliently compressed and effectively shortened when axial pressure is applied thereto, as shown in FIG. 9 of the drawings. In order to render this compressive shortening further feasible, a hollow 40 may be provided to extend through the shaft portion 32 of the tamper switch 30 in a somewhat diamond cutout shape, to enable the shaft 32 to be also compressed in addition to compression-of the thin frusto-conical web structure 38 connecting 34 and 36, thereby enabling the entire switch structure to be axially compressed when installed, for a purpose as described hereinbelow.

Preferably, although not necessarily, the entire tamper switch, as shown in FIGS. 7-10, may be constituted of an electrically non-conductive or dielectric silicon rubber, although a natural rubber or other suitable resiliently compressible material, which is substantially impervious to deleterious environmental, weather and temperature conditions, so as to impart a long service life thereto, is employable in connection with the invention.

At the end of the shaft portion 32 distant from projection 36, there is mounted or molded thereon a circular pad 42 constituted of an electrically-conductive material, preferably but not necessarily such as gold plated copper, or a carbon impregnated silicon rubber or any other suitable electrically-conductive metal.

Figure 3:
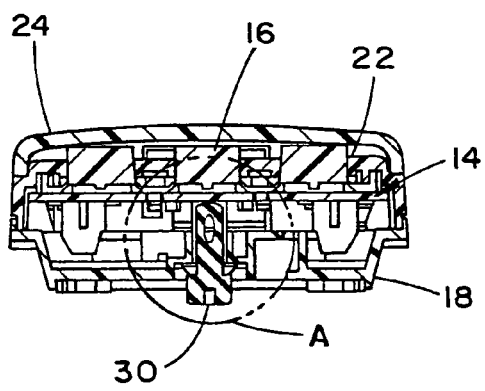
FIG. 3 illustrates a sectional view taken along line 3-3 in FIG. 1.
Figure 4:
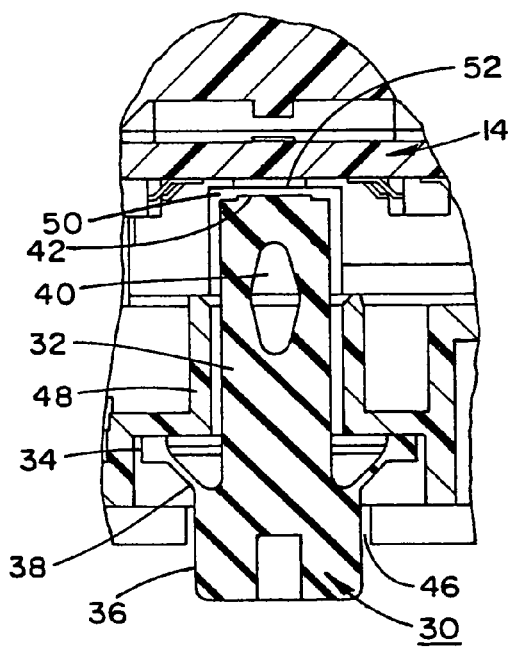
FIG. 4 illustrates an enlarged detailed view of the encircled portion A in FIG. 3.

Implementing an installation of the tamper switch 30 in the keypad housing 10, as shown in FIGS. 2, 3 and particularly FIG. 4, the cylindrical projection 36 is adapted to extend rearwardly and outwardly of an aperture 46 formed in the back panel or casing 18 of the keypad housing, the annular flange 34 biasing against an inner ring-shaped sleeve member 48 of casing 18, and with the end mounting the electrically-conductive pad 42 being at a short distance or gap 50 from an electrical circuit 52 on the printed circuit board 14. In effect, in an uncompressed state, as shown in FIG. 2 to 4 of the drawings, when the tamper switch 30 is positioned on the member 48 within the housing of the keypad 10, the electrically-conductive pad 42 on the shaft or post 32 end facing the printed circuit board 14 forms a gap 50 and may either short or cause a malfunction of the circuit 52, while the projection 36 distal thereto extends outwardly from the outer surface of the back panel or casing 18 of the keypad housing 10 in an armed condition of the keypad.

Figure 6:
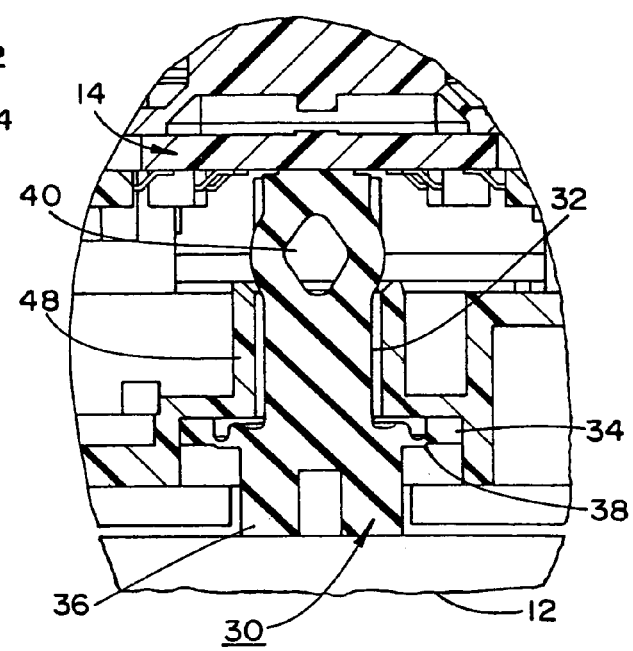
FIG. 6 illustrates an enlarged detailed view of the inventive tamper switch, similar to FIG. 4, shown in an installed wall mounted position of the device.

Upon the keypad 10 being mounted to a wall or surface 12, as shown in FIGS. 5 and 6 of the drawings, the attachment of the rear or back housing casing 18 to the wall imparts an axial compressive force to the projection 36 of the tamper switch 30, forcing the projection 36 forwardly into the keypad housing 10, with the flange 34 being pressed against the surface of the ring-shaped member 48, and thereby resultingly compressing the thin frusto-conical web structure 38, and possibly also the shaft portion 32, as shown in FIG. 9 of the drawings, thereby axially compressing and shortening the length of the tamper switch 30. This causes the electrically conductive pad 42 to be in firm electrically-conductive contact with the circuitry 52 on the printed circuit board 14, thereby closing the circuit, and rendering the entire structure to be in condition for proper operation upon the front cover member 22 being mounted and fastened to the back panel or casing 18 of the keypad housing 10.

Figure 7:
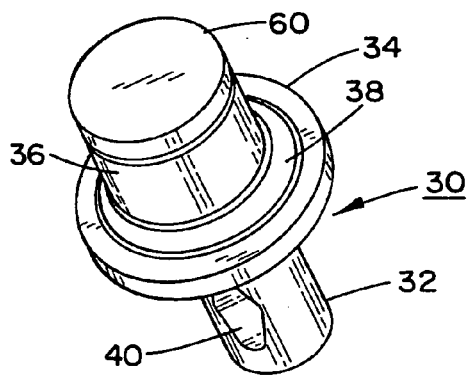
FIG. 7 illustrates a perspective view of the novel tamper switch.
Figure 8:
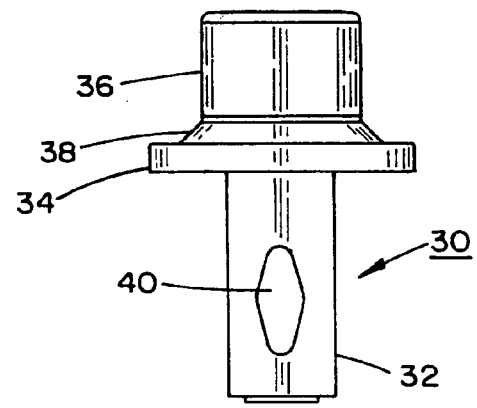
FIG. 8 illustrates a front view of the tamper switch.
Figure 10:
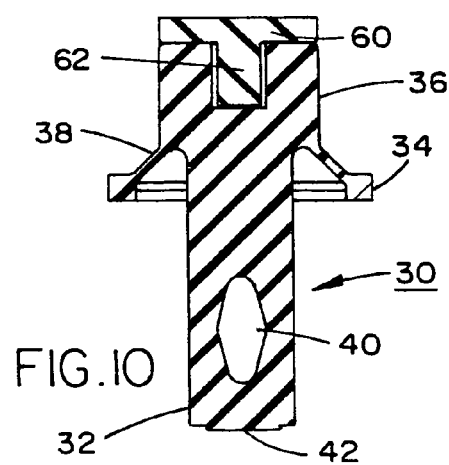
FIG. 10 illustrates a sectional view of the tamper switch with an extension plate mounted thereon.
Figure 11:
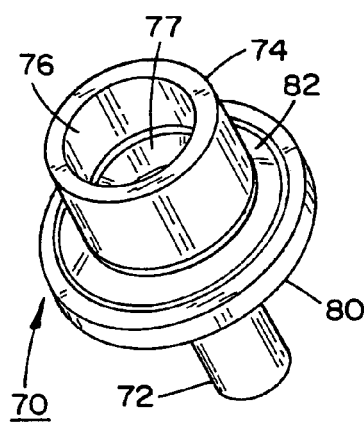
FIGS. 11, 12, 13 and 14 illustrate respectively perspective, front, sectional and compressed sectional views of a modified tamper switch pursuant to the invention.
Figure 12:
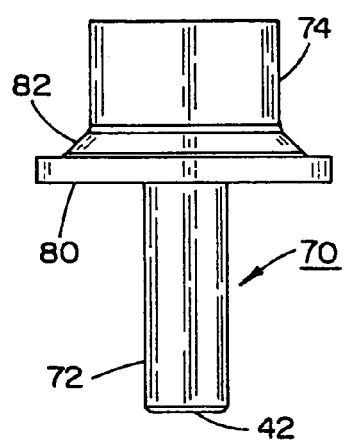
Figure 13:
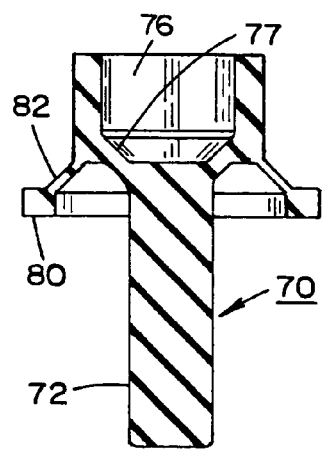
Figure 15:
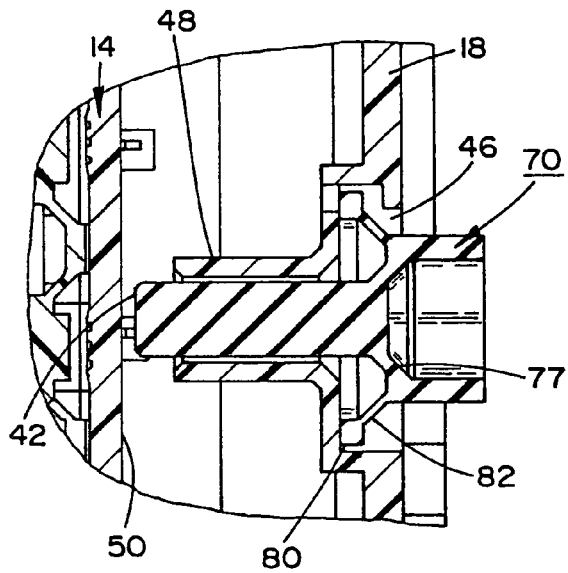
FIG. 15 illustrates the tamper switch of FIG. 11, as shown installed in a keypad.

As can be readily ascertained, the cylindrical projection 36 of the tamper switch 30 which extends rearwardly outwardly of the rear casing 18 of the keypad housing 10 is of a sufficient axial length so as to be able to compensate for any irregularities present in the wall surface 12 on which the keypad 10 is mounted. However, in the event that such wall irregularities are more extensive in nature, then as shown in FIGS. 7 and 10 of the drawings, an extension plate 60 having a shaft portion 62 may be mounted on the projection 36 of the tamper switch, with a hollow being formed in the projection 36, which is adapted to engagingly receive shaft portion 62. This extension plate 60, which increases the length of the tamper switch 30 can also be molded onto the projection 36, if desired.

When the keypad 10 is in operation, i.e., has been activated or "armed", in the event that an unauthorized person or intruder pulls the front cover member 22 of the keypad housing 10, which has the printed circuit board 14 fastened to the interior thereof, away from the back casing 18, which is fixedly mounted to the wall, the compressed web structure 38 and switch shaft 32 will expand by the compressive force having been lifted, as shown in FIG. 4, but will form gap 50 between the conductive pad 42 at the inner end of the switch to and the circuit 52 on the printed circuit board 14, thereby either causing a short or a malfunction to be affected in the circuit 52, and resultingly triggering an alarm and/or transmitting a signal indicating that the keypad 10 has been subjected to tampering by an intruder.

Furthermore, in the event that the keypad housing 10 is pulled away in its entirety by an unauthorized person or intruder from the wall or surface 12 on which it is mounted, without separation between casing parts 18 and 22, while the keypad is in an activated condition, the projection 36 will expand rearwardly and also permit for expansion of the tamper switch web 38, which, in essence, will also create a gap 50 between the electrically-conductive pad 42 at the leading end of shaft or post 32 and circuit 52 on the printed circuit board 14, as shown in FIG. 4, and thereby trigger an alarm and/or signal which can be transmitted to an appropriate alarm monitoring facility or law enforcement authority in order to alert them or other agencies involved with maintaining the integrity of the security system.

Figure 16:
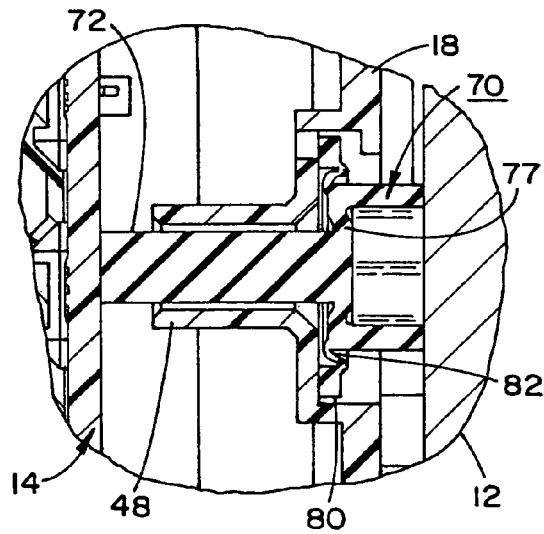
FIG. 16 illustrates the tamper switch similarly to FIG. 15, but with the keypad shown mounted on a wall surface.
Figure 14:
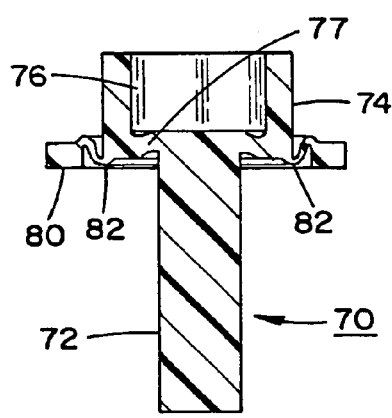
Figure 17:
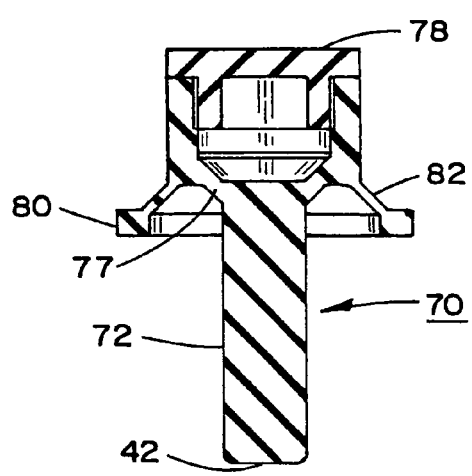
FIG. 17 illustrates a sectional view of the tamper switch shown with an extension plate mounted thereon.
Figure 18:
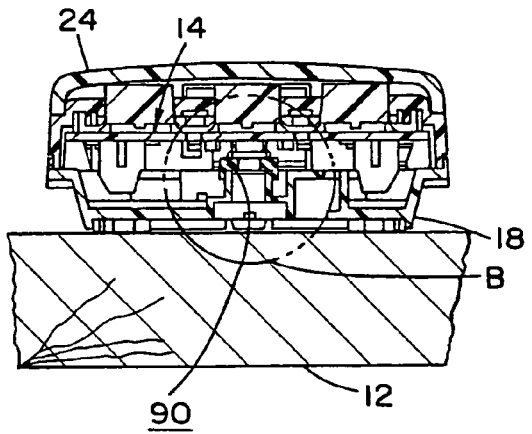
FIG. 18 illustrates a sectional view similar to FIG. 3 showing a modified tamper switch installed in the keypad, while mounted on a wall.
Figure 19:
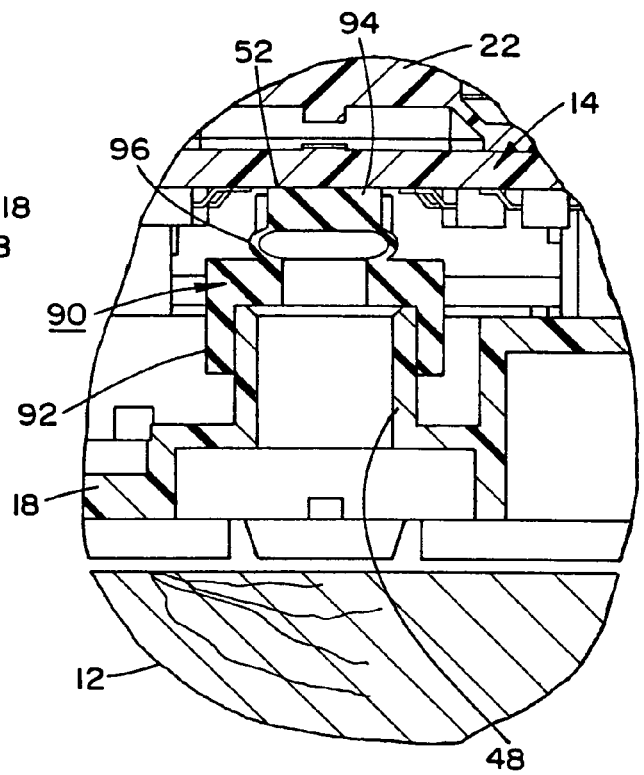
FIG. 19 illustrates an enlarged detailed view of the encircled portion B in FIG. 18.
Figure 20:
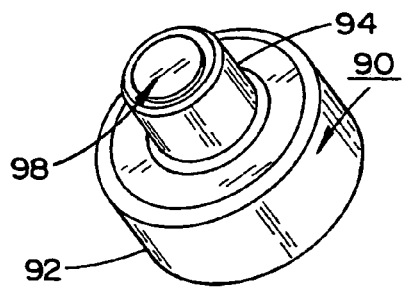
FIGS. 20-22 illustrate, respectively, perspective and sectional views of the tamper switch, as utilized in FIGS. 18 and 19.
Figure 21:
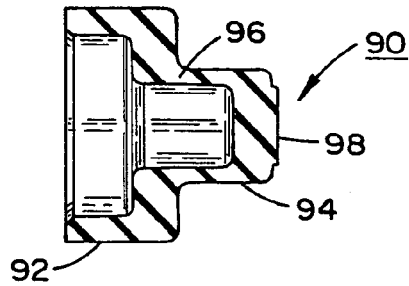
Figure 22:
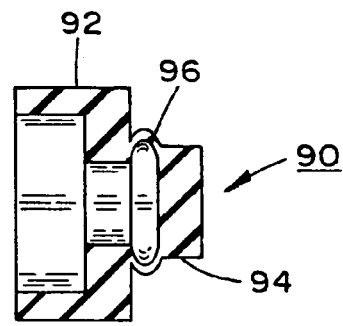

In a modified embodiment, wherein the basic operation of a tamper switch 70 is essentially similar to that as previously described, and wherein similar components are identified by the same reference numerals, in that instance, the tamper switch 70 has been somewhat modified in its configuration, as shown in FIGS. 11 to 17 of the drawings. In this instance, the compressively resilient or rubber shaft portion 72, as shown in the drawings, is connected to a projection 74, which is adapted, as heretofore, protrudes from the back panel 18 of the keypad housing 10 prior to being mounted to a rear wall 12, such as shown in FIG. 16 of the drawings. As previously stated, the projection 74 includes a hollow 76 which may be adapted to receive an extension pad 78, as shown in FIG. 17, to compensate for excessive irregularities in the wall mounting surface 12. An annular ring-shaped flange 80 is connected to the projection 74 by means of a thin, flexibly resilient frusto-conical annular web structure 82, the latter of which is compressible, as shown in FIG. 14 of the drawings, when the tamper switch 70 is installed and compressed upon mounting the keypad 10 on an upright surface or wall 12, as shown in FIG. 16 of the drawings. In this instance, although the function of the tamper switch 70 is identical to that of switch 30 as in the previous embodiment, in this instance; however, the configuration of the tamper switch 70 is somewhat different in that the shaft portion 72 does not possess a through aperture (such as aperture 40 in switch 30) and is not compressible in a manner analogous to that as in the first embodiment. However, in this embodiment, the connection between the shaft portion 72 and the projection 74 is provided by a resiliently flexible annular segment 77, which is also of a frusto-conical configuration. Consequently, the axial expansion and compression of switch 70 is provided for by both of the frusto-conical annular segment 77 and web structure 82, as shown in FIGS. 14 and 16 of the drawings. For the remainder, the function and structure of the keypad 10 is identical to that of the preceding embodiment and need not be repeated herein. However, in this embodiment, a primary distinction resides in that the deflection is provided for by a combined compression of the frusto-conical annular segment 77 and the web 82, rather than the potentially dual compressive action afforded by the tamper switch 30 of the previous embodiment, in which both the annular frusto-conical web 38 and the shaft portion 32 containing aperture 40 are compressible upon installation and mounting the keypad 10 on a wall or surface 12.

In the event that the keypad is mounted on a wall 12, which does not provide for a contact surface behind a projection 36 or 74 of the tamper switch 30 or 70, as in the previous embodiments, for example, when a tamper switch 90 is mounted over an opening in the wall or a deep cutout such as for a junction or switch box, in that instance, there is provided the tamper switch 90, as shown in FIGS. 18 to 22 of the drawings. In this instance, the tamper switch 90, as shown particularly in detail in FIGS. 20 to 22, includes a cylindrical portion 92, which is hollow in order to enable the mounting thereof on the cylindrical sleeve member 48 on the inner surface of the back panel 18 of the keypad housing 10, and includes a short smaller cylindrical projection 94 attached thereto or integrally therewith with the interposition of resiliently compressible annular thin web 96. The short cylindrical portion 94 has an electrically-conductive pad 98 on the surface thereof which faces towards the circuitry 52 printed circuit board 14, which is mounted in the keypad 10. In this instance, when mounted interiorly of the keypad housing in which the larger cylindrical portion is positioned on the guide sleeve member 48 in the back housing panel 18, and the front cover member 22 is closed, a compressive force is imparted to the tamper switch 90 such that the electrically-conductive pad 98 is in contact with the printed circuit board 14, thereby closing the circuit 52. Accordingly, when an unauthorized person or intruder pulls the front cover member 22, which has the printed circuit board 14 fastened thereto, away from the back panel which is fastened to the wall, this will form a gap 50 between the conductive pad 98 on the leading end of the tamper switch 90 and the circuit 52 on the printed circuit board 14, causing either a short or malfunction in the circuit 52, which will trigger an alarm and/or transmitting a signal signifying that an unlawful act has been committed by tampering with the keypad 10. Again, as in the previous embodiment, this will generate a signal at a monitoring location or a law enforcement authority, and may concurrently trigger an audible alarm alerting the site as to the tampering action by the unauthorized person or intruder.

Although the tamper switches 30, 70 and 90, as described herein, have been represented as consisting of cylindrical components, they may also be constituted as being polygonally-shaped in transverse cross-section, and the cylindrical shapes are not to be construed as being limiting in nature.

From the foregoing, it becomes clearly and readily apparent that the present invention is directed to a novel and economical structure for providing a tamper switch to produce a tamper resistant keypad, and whereby the tamper switch may be readily retrofitted on keypad structures which are currently in use. Concurrently, this invention, in the various embodiments thereof, enables the dual function of monitoring any tampering with a keypad in the event that either the front cover of the housing or casing is pulled away from a rear casing, while the latter remains fastened to the wall or mounting surface, or, alternatively, in case the keypad is pulled in its entirety away from its wall mounting position.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. In a security interface device, including a keypad having a back panel mountable on a wall surface and a cover panel detachably fastened to said back panel forming a keypad housing containing a printed circuit board and operative components fastened to the interior of said front panel; the provision of a tamper-detecting indicating mechanism; comprising:

a tamper switch including an elongate post member having a resiliently compressible element extending between said back panel and circuitry on said printed circuit board, said elongate post member comprising an elongate shaft portion; a cylindrical element extending co-axially with said shaft portion; a ring-shaped flange extending about said shaft portion, and said compressible element being a flexible web connecting said ring-shaped flange with said cylindrical element, said elongate post member having an electrically-conductive end contacting the circuitry on said printed circuit board in the mounted position of said keypad on said wall surface, whereby in an activated condition of said keypad, responsive to tampering by a pulling away of said cover panel from said back panel or pulling the keypad from said wall surface causes said electrically-conductive end to disengage from the circuitry on said printed circuit board so as to short or cause a malfunction in said circuitry and trigger a signal indicative of tampering.

2. A security interface device, as claimed in claim 1, wherein said tamper switch forms a gap with said circuitry on said printed circuit board responsive to an unauthorized pulling away of said keypad housing in its entirety from said wall surface so as to initiate a short or malfunction in said circuitry and trigger said tamper-indicating signal.

3. A security interface device, as claimed in claim 1, wherein said back panel includes an aperture enabling said cylindrical element to extend rearwardly outward of said back panel through said aperture and said elongate shaft portion of said tamper switch extends forwardly towards said printed circuit board, whereby mounting of said keypad on said wall surface presses said cylindrical element into the confines of said back panel so as to resiliently compress at least said flexible web biasing said flange into engagement with a support surface on the interior of said back panel and axially press said tamper switch into said keypad to cause said electrically-conductive end to contact the circuitry on said printed circuit board.

4. A security interface device, as claimed in claim 3, wherein said elongate shaft portion includes a through-aperture facilitating an axial compression of at least a portion of said switch so as to exert an enhanced axial pressure between said electrically-conductive end on said shaft portion and the circuitry on said printed circuit board.

5. A security interface device as claimed in claim 3, wherein tampering with said keypad by either pulling said cover panel away from said back panel while said back panel remains mounted on said wall surface or pulling the keypad in its entirety intact from said wall surface causes expansion of said resiliently compressible flexible web and forming a gap between said electrically-conductive end on said tamper switch and the circuitry on said printed circuit board to short the circuitry and trigger a signal indicative of tampering with said keypad.

6. In a security interface device, including a keypad having a back panel mountable on a wall surface and a cover panel detachably fastened to said back panel forming a keypad housing containing a printed circuit board and operative components fastened to the interior of said front panel; the provision of a tamper-detecting indicating mechanism; comprising:

a tamper switch including an elongate post member having a resiliently compressible element extending between said back panel and circuitry on said printed circuit board, said elongate post member comprises an elongate shaft portion; a cylindrical element extending co-axially with said shaft portion; a resiliently flexible annular segment connecting said shaft portion and said cylindrical element; a ring-shaped flange extending about said shaft portion, and said compressible element being a flexible web connecting said ring-shaped flange with said cylindrical element, said elongate post member having an electrically-conductive end contacting the circuitry on said printed circuit board in the mounted position of said keypad on said wall surface, whereby in an activated condition of said keypad, responsive to tampering by a pulling away of said cover panel from said back panel or pulling the keypad from said wail surface causes said electrically-conductive end to disengage from the circuitry on said printed circuit board so as to short or cause a malfunction in said circuitry and trigger a signal indicative of tampering.

7. A security interface device, as claimed in claim 6, wherein said back panel includes an aperture enabling said cylindrical element to extend rearwardly outward of said back panel through said aperture and said elongate shaft portion of said tamper switch extends forwardly towards said printed circuit board, whereby mounting of said keypad on said wall surface presses said cylindrical element into the confines of said back panel so as to resiliently compress each said resiliently flexible annular segment and said flexible web biasing said flange into engagement with a support surface on the interior of said back panel and axially press said tamper switch into said keypad to cause said electrically-conductive end to contact the circuitry on said printed circuit board.

8. A security interface device as claimed in claim 7, wherein tampering with said keypad by either pulling said cover panel away from said back panel while said back panel remains mounted on said wall surface or pulling the keypad in its entirety intact from said wall surface causes expansion of both said resiliently flexible annular segment and said resiliently compressible flexible web and forming a gap between said electrically-conductive end on said tamper switch and the circuitry on said printed circuit board to short or cause a malfunction in the circuitry and trigger a signal indicative of tampering with said keypad.

9. A security interface device, as claimed in claim 3, wherein said elongate shaft portion includes a through-aperture facilitating an axial compression of at least a portion of said switch so as to exert an enhanced axial pressure between said electrically-conductive end on said shaft portion and the circuitry on said printed circuit board.

10. A security interface device as claimed in claim 3, wherein tampering with said keypad by either pulling said cover panel away from said back panel while said back panel remains mounted on said wall surface or pulling the keypad in its entirety intact from said wall surface causes expansion of said resiliently compressible flexible web and forming a gap between said electrically-conductive end on said tamper switch and the circuitry on said printed circuit board to short the circuitry and trigger a signal indicative of tampering with Keypad.

11. A security interface device, as claimed in claim 1 or 6, wherein said tamper switch is constituted of an electrically non-conductive material.

12. A security interface device, as claimed in claim 11, wherein said material is selected from the group consisting of rubber and silicon rubber.

13. A security interface device, as claimed in claim 1, wherein said electrically-conductive end on said tamper switch comprises a pad element fastened or molded to said shaft portion of the tamper switch.

14. A security interface device, as claimed in claim 13, wherein said electrically conductive pad element is constituted of a gold-plated copper disc number.

15. A security interface device, as claimed in claim 13, wherein said electrically conductive pad element is constituted of a metallic, conductive rubber or conductive plastic material composition.

16. A security interface device, as claimed in claim 3 or 7, wherein said cylindrical element of the tamper switch mounts a pad at the protruding end so as to increase the extent of rearward projection of said tamper switch from said back panel prior to mounting on said wall surface so as to compensate for irregularities in the wall surface mounting thereon of said keypad.

17. A method of providing a security interface device incorporating a tamper-indicating mechanism, including a keypad having a back panel mountable on a wall surface and a cover panel detachably fastened to said back panel forming a keypad housing containing a printed circuit board and operative components fastened to the interior of said front panel; the method comprising:

providing a tamper switch including an elongate post member having a resiliently compressible element extending between said back panel and circuitry on said printed circuit board, said elongate post member comprises an elongate shaft portion; a cylindrical element extending co-axially with said shaft portion a ring-shaped flange extending about said shaft portion, and said compressible element being a flexible web connecting said ring-shaped flange with said cylindrical element, said elongate post member having an electrically-conductive end contacting the circuitry on said printed circuit board in the mounted position of said keypad on said wall surface, whereby in an activated condition of said keypad, responsive to tampering by a pulling away of said cover panel from said back panel or pulling the keypad from said wall surface causes said electrically-conductive end to disengage from the circuitry on said printed circuit board so as to short or cause a malfunction in said circuitry and trigger a signal indicative of tampering.

18. A method of providing a security interface device, as claimed in claim 17, wherein said tamper switch forms a gap with said circuitry on said printed circuit board responsive to an unauthorized pulling away of said keypad housing in its entirety from said wall surface so as to initiate a short or malfunction in said circuitry and trigger said tamper-indicating signal.

19. A method of providing a security interface device, as claimed in claim 17, wherein said back panel includes an aperture enabling said cylindrical element to extend rearwardly outward of said back panel through said aperture and said elongate shaft portion of said tamper switch extends forwardly towards said printed circuit board, whereby mounting of said keypad on said wall surface presses said cylindrical element into the confines of said back panel so as to resiliently compress at least said flexible web biasing said flange into engagement with a support surface on the interior of said back panel and axially press said tamper switch into said keypad to cause said electrically-conductive end to contact the circuitry on said printed circuit board.

20. A method of providing a security interface device, as claimed in claim 19, wherein said elongate shaft portion includes a through-aperture facilitating an axial compression of at least a portion of said switch so as to exert an enhanced axial pressure between said electrically-conductive end on said shaft portion and the circuitry on said printed circuit board.

21. A method of providing a security interface device as claimed in claim 19, wherein tampering with said keypad by either pulling said cover panel away from said back panel while said back panel remains mounted on said wall surface or pulling the keypad in its entirety intact from said wall surface causes expansion of said resiliently compressible flexible web and forming a gap between said electrically-conductive end on said tamper switch and the circuitry on said printed circuit board to short or cause a malfunction in the circuitry and trigger a signal indicative of tampering with said keypad.

22. A method of providing a security interface device incorporating a tamper-indicating mechanism, including a keypad having a back panel mountable on a wall surface and a cover panel detachably fastened to said back panel forming a keypad housing containing a printed circuit board and operative components fastened to the interior of said front panel; the method comprising: providing a tamper switch including an elongate post member having a resiliently compressible element extending between said back panel and circuitry on said printed circuit board, said elongate post member comprising an elongate shaft portion; a cylindrical element extending co-axially with said shaft portion; a resiliently flexible annular segment connecting said shaft portion and said cylindrical element; a ring-shaped flange extending about said shaft portion, and said compressible element being a flexible web connecting said ring-shaped flange with said cylindrical element, said elongate post member having an electrically-conductive end contacting the circuitry on said printed circuit board in the mounted position of said keypad on said wall surface, whereby in an activated condition of said keypad, responsive to tampering by a pulling away of said cover panel from said back panel or pulling the keypad from said wall surface causes said electrically-conductive end to disengage from the circuitry on said printed circuit board so as to short or cause a malfunction in said circuitry and trigger a signal indicative of tampering.

23. A method of providing a security interface device, as claimed in claim 22, wherein said back panel includes an aperture enabling said cylindrical element to extend rearwardly outward of said back panel through said aperture and said elongate shaft portion of said tamper switch extends forwardly towards said printed circuit board, whereby mounting of said keypad on said wall surface presses said cylindrical element into the confines of said back panel so as to resiliently compress each said resiliently flexible annular segment and said flexible web biasing said flange into engagement with a support surface on the interior of said back panel and axially press said tamper switch into said keypad to cause said electrically-conductive end to contact the circuitry on said printed circuit board.

24. A method of providing a security interface device as claimed in claim 23, wherein tampering with said keypad by either pulling said cover panel away from said back panel while said back panel remains mounted on said wail surface or pulling the keypad in its entirety intact from said wall surface causes expansion of said resiliently flexible annular segment and of said flexible web forming a gap between said electrically-conductive end on said tamper switch and the circuitry on said printed circuit board to short or cause a malfunction in the circuitry and trigger a signal indicative of tampering with said keypad.

25. A method of providing a security interface device, as claimed in claim 17 or 22, wherein said tamper switch is constituted of an electrically non-conductive material.

26. A method of providing a security interface device, as claimed in claim 25, wherein said material is selected from the group of materials consisting of rubber and silicon rubber.

27. A method of providing a security interface device, as claimed in claim 17, wherein said electrically-conductive end on said tamper switch comprises a pad element fastened or molded to said shaft portion of the tamper switch.

28. A method of providing a security interface device, as claimed in claim 27, wherein said electrically-conductive pad element is constituted of a gold-plated copper plate member.

29. A method of providing a security interface device, as claimed in claim 27, wherein said electrically-conductive pad element is constituted of a metallic, conductive rubber or conductive plastic material composition.

30. A method of providing a security interface device, as claimed in claim 19, wherein said cylindrical element of the tamper switch mounts a pad at the protruding end so as to increase the extent of rearward projection of said tamper switch from said back panel prior to mounting on said wall surface so as to compensate for irregularities in the wall surface mounting said keypad.

31. A security interface device, as claimed in claim 6, wherein said tamper switch forms a gap with said circuitry on said printed circuit board responsive to an unauthorized pulling away of said keypad housing in its entirety from said wall surface so as to initiate a short or malfunction in said circuitry and trigger said tamper-indicating signal.

32. A method of providing a security interface device, as claimed in claim 22, wherein, said tamper switch forms a gap with said circuitry on said printed circuit board responsive to an unauthorized pulling away of said keypad housing in its entirety from said wall surface so as to initiate a short or malfunction in said circuitry and trigger said tamper-indicating signal.

* * * * *